United States Patent [19]
Fulkerson et al.

[11] Patent Number: 5,348,135
[45] Date of Patent: Sep. 20, 1994

[54] CAN SELECTOR BAR ASSEMBLY

[75] Inventors: Gregory M. Fulkerson, Maple Plain; Melvin Allrich, Chanhassen, both of Minn.

[73] Assignee: Thiele Engineering Company, Minneapolis, Minn.

[21] Appl. No.: 20,410

[22] Filed: Feb. 22, 1993

[51] Int. Cl.$^5$ .............................................. B65G 47/26
[52] U.S. Cl. .................. 198/419.3; 198/734
[58] Field of Search ............ 198/419.3, 731, 733, 198/734, 719; 53/543

[56] References Cited

U.S. PATENT DOCUMENTS

| | | | |
|---|---|---|---|
| 3,160,263 | 12/1964 | Lewis | 198/719 |
| 3,417,540 | 12/1968 | Copping et al. | 198/419.3 |
| 3,827,211 | 8/1974 | Zavatone et al. | 198/419.3 |
| 3,955,666 | 5/1976 | Braun et al. | 198/731 |
| 4,098,392 | 7/1978 | Greene | 198/419.3 |
| 4,250,988 | 2/1981 | Miaskoff | 198/734 |
| 5,036,644 | 8/1991 | Lashyno et al. | 53/543 |
| 5,201,823 | 4/1993 | Pazdernik | 198/419.3 |
| 5,232,083 | 8/1993 | Motominami et al. | 198/719 |

*Primary Examiner*—Joseph E. Valenza
*Attorney, Agent, or Firm*—Hugh D. Jaeger

[57] ABSTRACT

Can selector bar assembly including one or more can selector flight bars, each having an angled tip comprised of a rubber or plastic-like material for non-scoring or scratching separation of product.

9 Claims, 6 Drawing Sheets

CAN SELECTOR BAR ASSEMBLY

BACKGROUND OF THE INVENTION

1. Field of the Invention

The present invention pertains to the packaging industry, and more particularly, relates to separator bars which separate cans or other items in a packaging machine, such as a can packaging machine or a beverage packaging machine.

2. Description of the Prior Art

Certain prior art devices have often caused product scratching or denting during the process of inserting dividing bars amid oncoming or adjacent randomly flowing lines of product, thus causing unwanted cosmetic product flaws, such as scratches, creases, or the like.

The present invention overcomes the faults of the prior art devices by providing divider flight bars having a soft rubber or plastic tip.

SUMMARY OF THE INVENTION

The general purpose of the present invention is to provide a can selector flight bar assembly having can selector flight bars with a tip of polyurethane plastic or other like material which divides a group of cans or other product members without causing scratches, dents, or other cosmetic disfigurations.

According to one embodiment of the present invention, there is provided a group of can selector flight bars which can be used as a unit or can be utilized separately. Each can selector flight bar includes a rectangular shaped flight bar member having a tip or nose of soft polyurethane or the like secured to one end of the rectangular shaped flight bar member. A pin arrangement secures the nose or tip to the end of the rectangular portion of the flight bar. The pinning arrangement is such that the tips are reversible and may be used for travel in various directions or opposing sides of multilane packaging devices.

One significant aspect and feature of the present invention is a can selector flight bar having a tip or nose which will not cosmetically or otherwise damage a product being divided for packaging.

Another significant aspect and feature of the present invention is a soft tip or nose for use with a dual bar can selector flight bar system.

A further significant aspect and feature of the present invention is a soft tip or nose being secured to a flight bar body by a pin arrangement.

Still another significant aspect and feature of the present invention is a soft tip or nose which is reversible.

Having thus described one embodiment of the present invention, it is the principal object hereof to provide a can selector flight bar or bars having a non-scoring and non-marring top.

One object of the present invention is a flight selector bar with a polymer tip which negates denting or scratching of a container.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
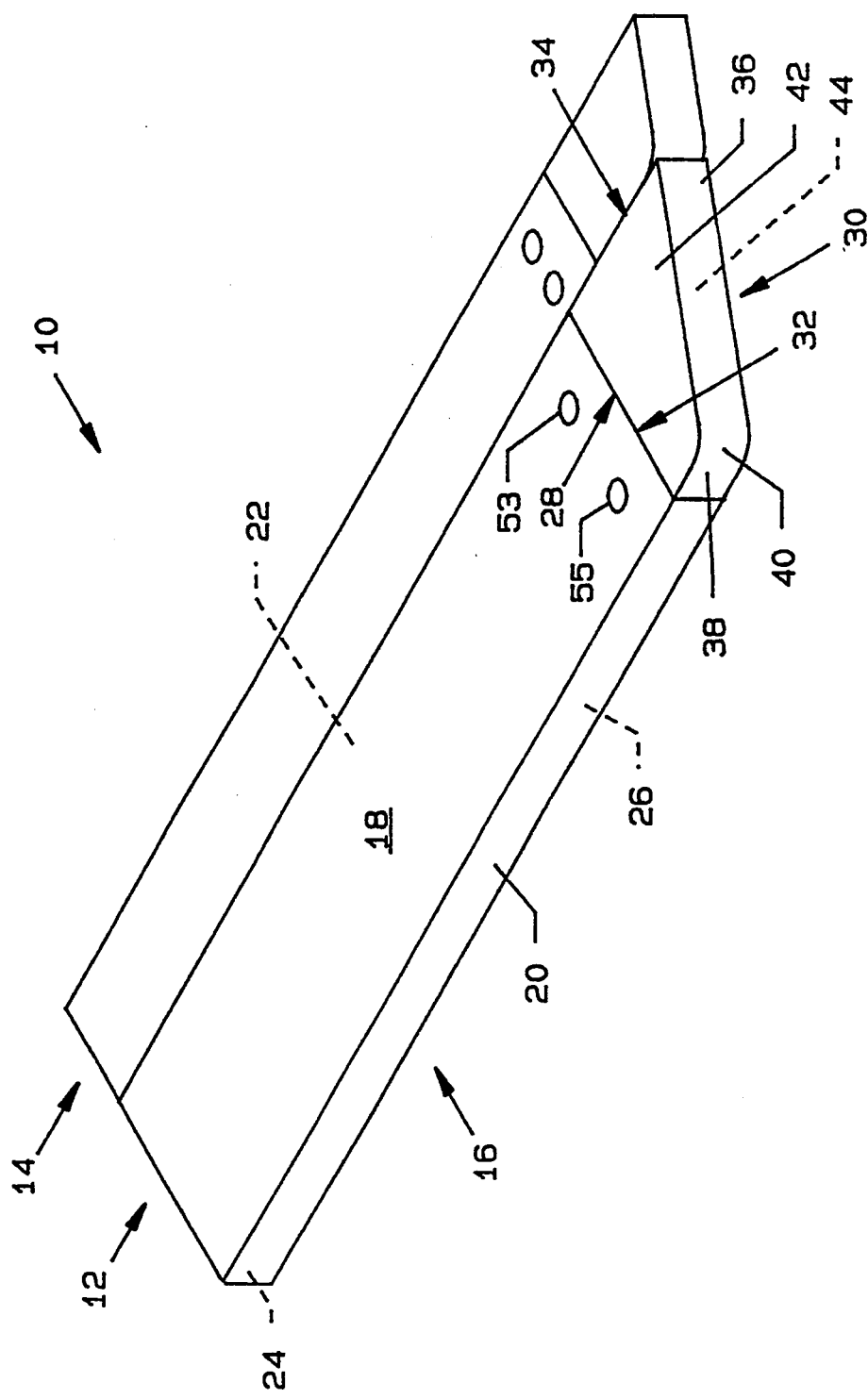
FIG. 1 illustrates a perspective view of a can flight selector bar assembly.

FIG. 1 illustrates a can selector flight bar assembly 10 including can selector flight bars 12 and 14 used together in close proximity as illustrated, or at a distance from each other to separate product, such as cans or other products as described in co-pending patent applications. The can selector flight bars 12 and 14 are similar in concept and design. The can selector flight bar 12 includes a rectangular shaped member 16 having a top 18, sides 20 and 22, an outboard end 24, a bottom 26 and an inboard end 28, as also illustrated in the figures that follow. A configured tip 30 comprised of 80 durometer polyurethane (Shore A) secures as later described to the inboard end 28 of the rectangular shaped member 16. The durometer can be in a range of 50–150 durometers. The tip 30 includes a vertically aligned first edge 32 which mates to the inboard end 28 of the can selector flight bar 12, a second edge 34, at third and fourth edge 36 and 38 having a radiused edge portion 40 therebetween, a top surface 42, and a bottom surface 44. The fourth edge 36 is angled to aid in selection of cans or other product.

Figure 2:
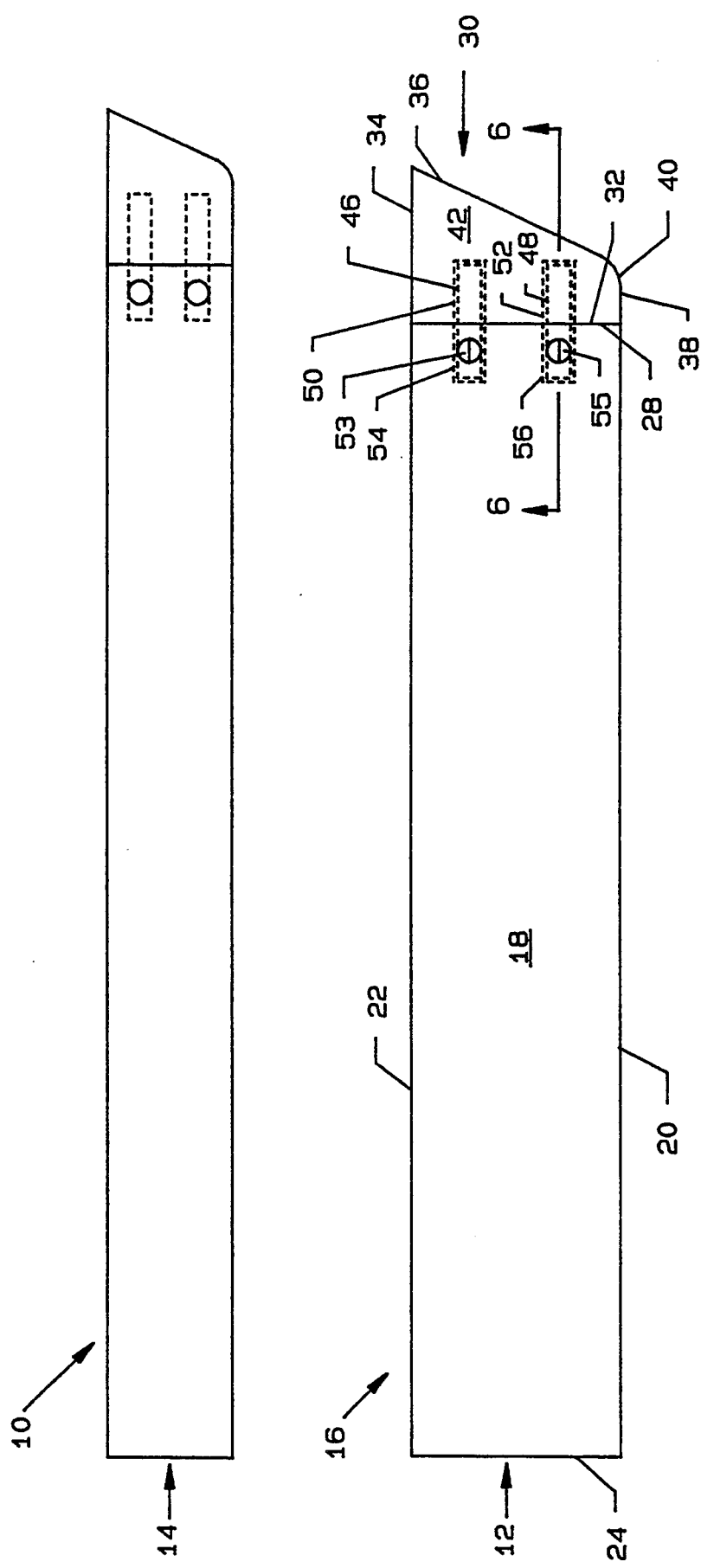
FIG. 2 illustrates a top view of a separated can selector flight bar assembly.

FIG. 2 illustrates a top view of the can selector flight bar assembly 10 where all numerals correspond to those elements previously described. The can selector flight bars 12 and 14 are distanced from each other such as for separating out a different number of cans or other items as described in co-pending or existing patent applications. Illustrated in particular are pins 46 and 48 shown in dashed lines used to secure the tip 30 to the rectangular shaped member 16. The pins 46 and 48 frictionally engage holes 50 and 52 of the tip 30, respectively. The opposing ends of pins 46 and 48 are secured in holes 54 and 56 in the rectangular shaped member 16 as later described in detail. Also illustrated are set screws 53 and 55 in the body of the rectangular shaped member 18 which are utilized to clamp against the pins 46 and 48. Opposing set screws, not illustrated, clamp against the opposite side of the pins 46 and 48.

Figure 3:
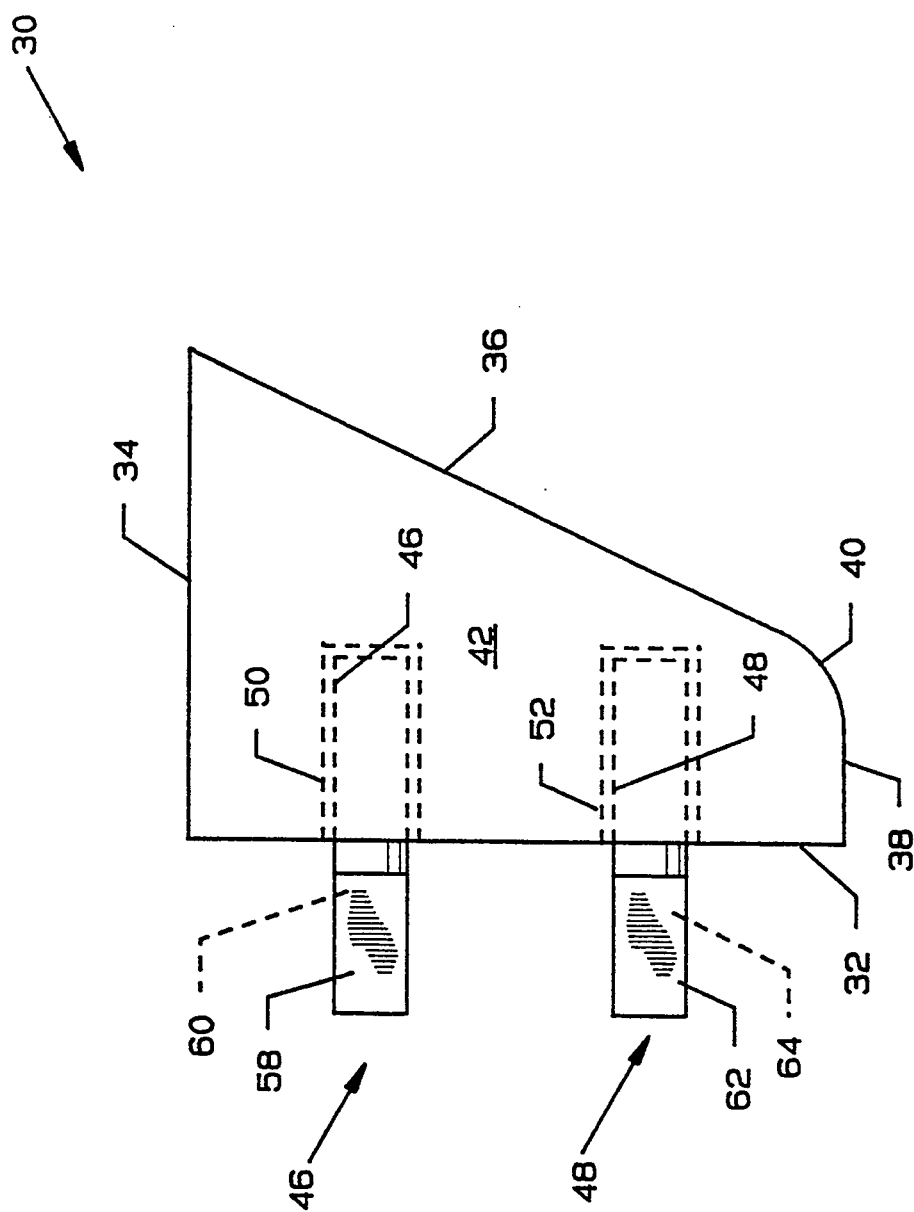
FIG. 3 illustrates a top view of a tip.

FIG. 3 illustrates a top view of the tip 30 where all numerals correspond to those elements previously described. Pin 46 includes opposing flat surfaces 58 and 60, and pin 48 includes opposing flat surfaces 62 and 64.

Figure 4:
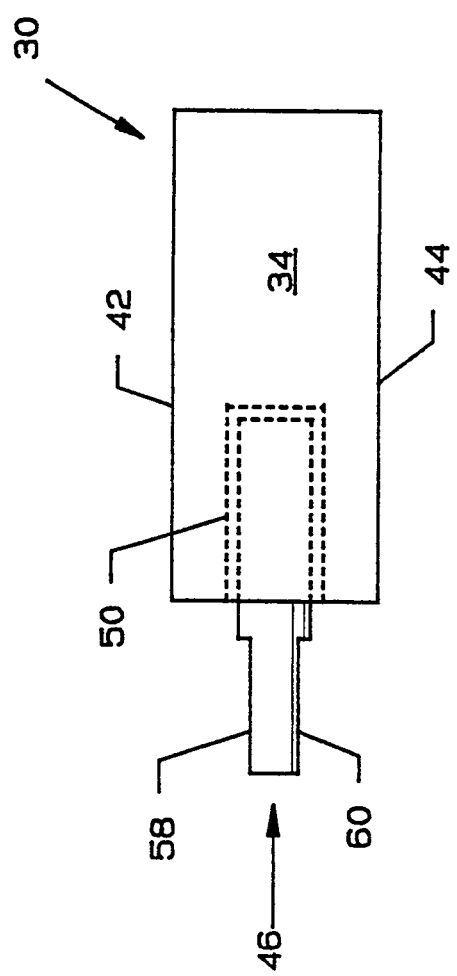
FIG. 4 illustrates a side view of a tip.

FIG. 4 illustrates a side view of the tip 30 where all numerals correspond to those elements previously described. Illustrated in particular are the flattened surfaces 58 and 60 on the pin 46.

Figure 5:
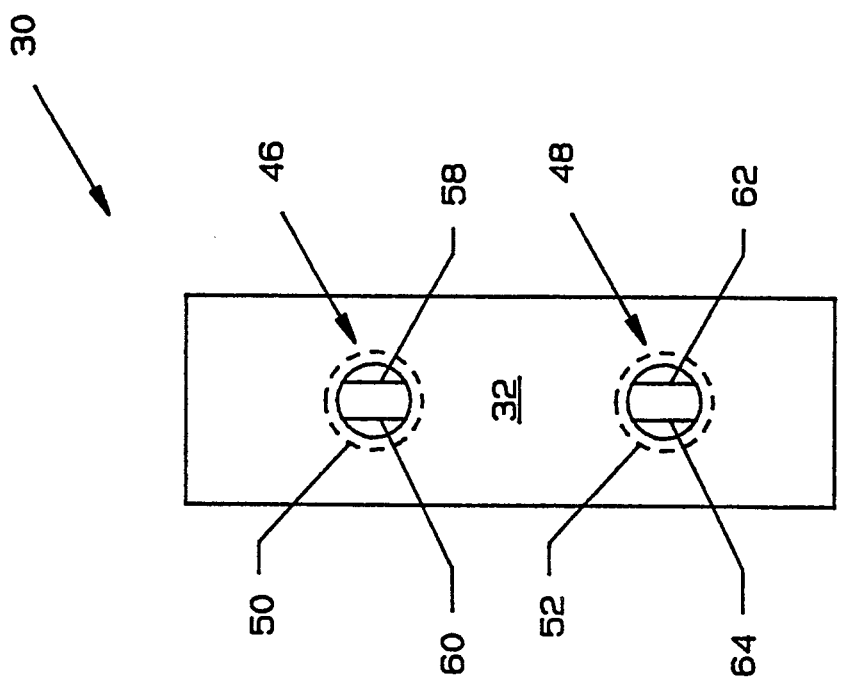
FIG. 5 illustrates a side view of the tip.

FIG. 5 illustrates a view of the edge 32 of the tip 30. Illustrated in particular are the flattened areas of the pins 46 and 48.

Figure 6:
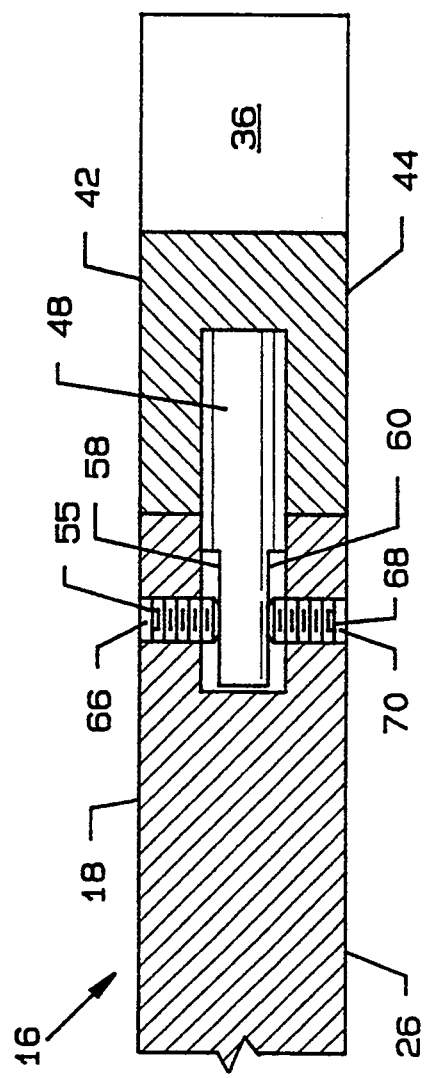
FIG. 6 illustrates a cross-sectional view along line 6—6 of FIG. 2 where all numerals correspond to those elements previously described.

FIG. 6 illustrates a cross-sectional view along line 6—6 of FIG. 2 where all numerals correspond to those elements previously described. Set screw 55 aligns in a threaded hole 66 against the flattened surface 58 of the pin 48. In a like fashion, a set screw 68 aligns in a threaded hole 70 against the flattened surface 60 of the pin 48. All pins are secured in this fashion to insure secure engagement of the tip 30 to the rectangular shaped member 16.

MODE OF OPERATION

The flight selector bar of the present invention operates in a manner similar to that of other flight selector bars with the exception of the unique and novel feature of the rounded polymer tip separating cans or other containers without scoring, scratching or denting the cans or containers. The design eliminates all possibilities of damage. This provides product which is acceptable to the consumer.

Various modifications can be made to the present invention without departing from the apparent scope hereof.

We claim:

1. A flight selector bar for a packaging machine comprising:
   a. a flight selector bar of a rectangular configuration for insertion in a flowing line of products for separating the products; and,
   b. a tip secured by securing means to said flight selector bar for contacting the products, the tip being made of soft material for minimizing damage to product.

2. A flight selector bar of claim 1 wherein said tip is a polymer material.

3. A flight selector bar of claim 1 wherein said tip is secured by screws to said flight selector bar.

4. A flight selector bar of claim 1 wherein said tip is polyurethane.

5. A flight selector bar of claim 4 wherein said polyurethane is 80 durometers.

6. A flight selector bar of claim 4 wherein said polyurethane is Shore A.

7. A product divider bar for insertion in a flow of products for separating the flow in a packaging machine comprising:
   a. a rectangular member having an end for insertion into the flow of products;
   b. a tip, made of a polymer having a durometer sufficiently soft to minimize damage to product, removably secured to the end of the rectangular member.

8. The divider bar of claim 7, further comprising an angled edge on the tip having a leading relatively pointed tip and a trailing edge with a convexly radiused edge.

9. The divider bar of claim 8, wherein the tip is reversibly mounted on the rectangular member.

* * * * *